United States Patent
Miyajima et al.

(10) Patent No.: US 7,354,494 B2
(45) Date of Patent: Apr. 8, 2008

(54) APPARATUS AND METHOD FOR MANUFACTURING LAMINATED SUBSTRATE

(75) Inventors: Yoshimasa Miyajima, Kasugai (JP); Ariyoshi Shibata, Kasugai (JP); Joji Hasegawa, Kasugai (JP); Tetsuji Kadowaki, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/935,240

(22) Filed: Sep. 8, 2004

(65) Prior Publication Data

US 2005/0199346 A1   Sep. 15, 2005

(30) Foreign Application Priority Data

Mar. 15, 2004   (JP)  ............................. 2004-073115

(51) Int. Cl.
    *B32B 37/00*   (2006.01)
(52) U.S. Cl. .................. 156/64; 156/228; 156/285; 156/381; 156/538; 156/580
(58) Field of Classification Search ............... 156/228, 156/285, 286, 381, 382, 538, 539, 580, 583.1, 156/64, 350
    See application file for complete search history.

(56) References Cited

U.S. PATENT DOCUMENTS

| | | | |
|---|---|---|---|
| 5,407,519 A * | 4/1995 | Joffe et al. ................. | 156/358 |
| 5,667,624 A * | 9/1997 | Akimoto et al. ............ | 156/389 |
| 5,795,430 A * | 8/1998 | Beeteson et al. ........... | 156/350 |
| 6,042,689 A * | 3/2000 | Prester et al. ............. | 156/583.1 |
| 6,245,167 B1 * | 6/2001 | Stein ........................... | 156/64 |
| 6,618,937 B2 * | 9/2003 | Onitsuka ..................... | 29/832 |
| 6,793,756 B2 * | 9/2004 | Lee et al. .................... | 156/228 |
| 2003/0178150 A1 * | 9/2003 | Lee et al. .................... | 156/580 |
| 2004/0089415 A1 * | 5/2004 | Byun et al. ................. | 156/285 |

FOREIGN PATENT DOCUMENTS

| | | |
|---|---|---|
| JP | 2002-229044 | 8/2002 |
| JP | 2004-102215 | 4/2004 |
| KR | 10-2004-0010244 | 1/2004 |

OTHER PUBLICATIONS

Communication from the Korean Patent Office received on counterpart korean application, dated Jun. 30, 2006, wtih English translation, 5 pages.

* cited by examiner

*Primary Examiner*—James Sells
(74) *Attorney, Agent, or Firm*—Kratz, Quintos & Hanson, LLP.

(57) ABSTRACT

An apparatus for manufacturing a laminated substrate with a simple structure and with satisfactory yield. First and second holding plates each attract substrates without contacting a laminating surface of the two substrates. A substrate conveying device conveys the substrates into the processing chamber. The substrate conveying device attracts only the surface of a substrate that is opposite to the laminating surface, transfers the substrate to a holding plate, and receives the substrate from the holding plate.

27 Claims, 13 Drawing Sheets

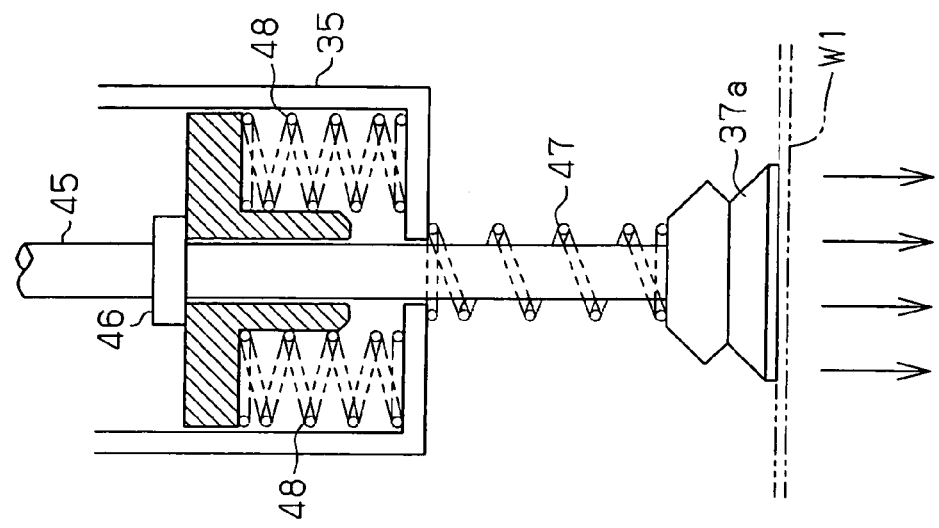
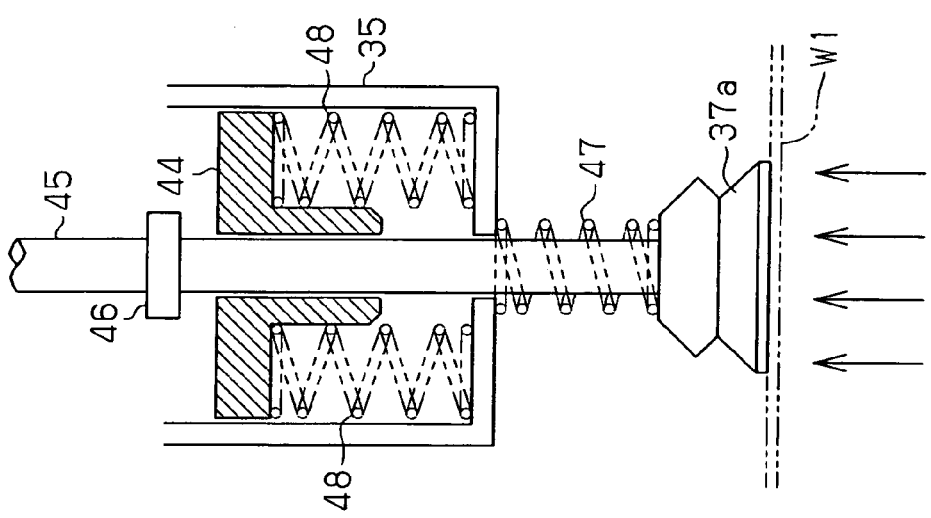
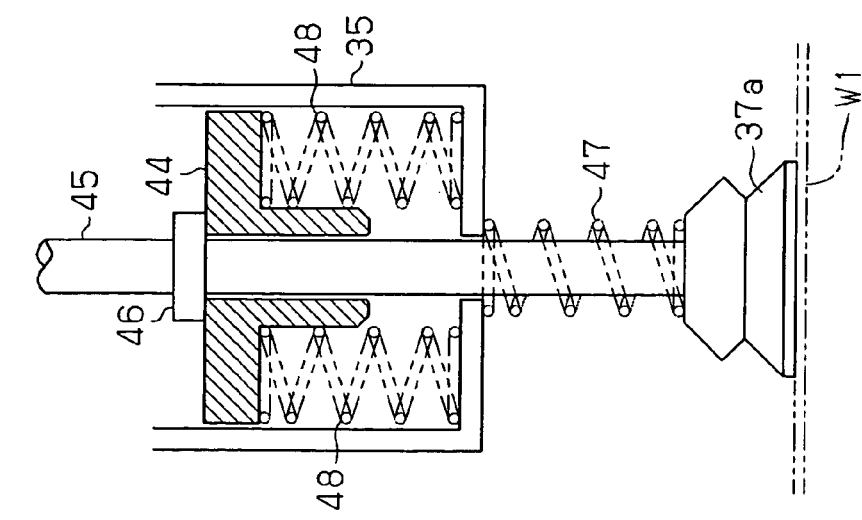

APPARATUS AND METHOD FOR MANUFACTURING LAMINATED SUBSTRATE

CROSS-REFERENCE TO RELATED APPLICATIONS

This application is based upon and claims the benefit of priority from prior Japanese Patent Application No. 2004-073115, filed on Mar. 15, 2004, the entire contents of which are incorporated herein by reference.

BACKGROUND OF THE INVENTION

1. Field of the Invention

The present invention relates to an apparatus and a method for manufacturing a laminated substrate (panel) by laminating two substrates.

2. Description of the Related Art

Recently, with flat panel displays such as liquid crystal displays (LCDs) becoming larger and thinner, the demand for a reduction in the cost of manufacturing such displays is increasing. To meet such a demand, an apparatus for laminating two substrates is also required for application in such enlargement while improving productivity.

A liquid crystal panel is manufactured in the following manner. First, an array substrate (TFT substrate), in which a plurality of TFTs (thin film transistors) are formed in a matrix, and a color filter substrate (CF substrate), in which color filters (red, green, blue) and a light shielding film are formed, are arranged facing each other with an extremely narrow gap (approximately a few micrometers) in between. Liquid crystal is filled in the gap between the two substrates. The light shielding film is used to obtain high contrast or to shield the TFTs and prevent the occurrence of light leakage current. The TFT substrate and the CF substrate are laminated with a sealing material (adhesive) that contains, for example, a thermosetting resin.

In the conventional method for manufacturing the liquid crystal panel, a liquid crystal-dropping process is performed when filling the liquid crystal between two glass substrates. More specifically, a frame of the sealing material is formed on one side of the TFT substrate along the edges of the substrate. A certain amount of liquid crystal is dropped onto a region defined in the frame of the sealing material. Subsequently, the TFT substrate and the CF substrate are laminated in a vacuum environment to seal the liquid crystal between the substrates.

After filling the liquid crystal, the two substrates are laminated by pressurizing the two substrates using a laminating device or a pressing apparatus. The pressing apparatus includes an upper holding plate and a lower holding plate arranged facing each other in a processing chamber. The pressing apparatus moves the two holding plates toward each other with the holding plates parallel to each other to keep the gap between the two substrates even.

A conventional pressing apparatus will now be described with reference to FIGS. 1 to 3. In a processing chamber, lower holding members 2 are movable on a table 1 in upward and downward directions. A pressing plate 3 is arranged above the lower holding members 2 and is movable in upward and downward directions.

Robot hands 4a, 4b convey an upper substrate W1 and a lower substrate W2 into the processing chamber and a laminated substrate (panel) W3 out of the processing chamber. Shutters 5, normally positioned outside the processing chamber, enter the processing chamber when the upper substrate W1 is conveyed into processing chamber. The shutters 5 aid in attracting the upper substrate W1 to the pressing plate 3.

The conveying operation of the substrates W1 and W2 will now be discussed. First, the robot hand 4a attracting and holding an upper surface of the upper substrate W1 enters the processing chamber. The shutters 5 then close and enter the processing chamber, as shown in FIG. 2.

As shown in FIG. 3, the robot hand 4a is then lowered. This places the peripheral portion of the substrate W1 on the shutters 5. Further, the central portion of the substrate W1 is attracted to an upper holding member (not shown). The robot hand 4a then releases the substrate W1 and moves out of the processing chamber. When moving out of the processing chamber, the robot hand 4a conveys the substrate W3, which was laminated in the previous cycle and which is supported on the lower holding members 2, out of the processing chamber.

The upper holding member is then raised and the substrate W1 is attracted to the pressing plate 3. The substrate W2 held by the robot hand 4b is conveyed into the processing chamber and attracted to the table 1.

After the robot hand 4b is moved out of the processing chamber, the processing chamber is tightly sealed. Then, the pressing plate 3 is lowered to press and laminate the substrates W1 and W2 with the table 1.

Japanese Patent Publication No. 2002-229044 describes a conventional example of the substrate laminating apparatus.

In the prior art, the means for holding the substrates W1 and W2 on the pressing plate 3 and the table 1 is either a vacuum chuck (vacuum attraction means) or an electrostatic chuck (electrostatic attraction means).

When laminating the substrates W1, W2 in a depressurized processing chamber, the vacuum chuck stops functioning to hold the substrates. Thus, the substrates W1 and W2 are electrostatically held. More specifically, voltage is applied to electrodes arranged on the table 1 and the pressing plate 3 and to an electrically conductive film formed on the substrate. This generates Coulomb force between the substrate and the electrode and electrostatically attracts the substrate.

SUMMARY OF THE INVENTION

During transportation of the substrate W1 with the robot hand 4a, the substrate W1 is deformed or flexed as a result of its own weight. The robot hand 4a is also deformed or flexed at its distal portion as a result of its own weight, which in turn further deforms the substrate W1. This deformation has increased in recent substrates, which are larger and thinner.

When the substrate W1 deforms, the attraction of the substrate W1 to the pressing plate 3 becomes unstable. In addition, when the substrate W1 is attracted to the pressing plate 3 in a deformed state, the substrate W1 may become displaced with respect to the pressing plate 3 or separated from the pressing plate 3 when the processing chamber is depressurized.

When the substrate W1 is electrostatically attracted to the pressing plate 3 in a deformed state, glow discharge tends to occur when depressurizing the processing chamber. The flow discharge may damage circuits and TFT elements on the substrate.

When attracting the substrate W1 to the pressing plate 3, the shutters 5 enter the processing chamber. The shutters 5 support the peripheral portion of the substrate W1. That is, the shutters 5 contact the laminating surface (surface on the side facing towards the substrate W2) of the substrate W1. Due to such contact, foreign materials, such as particles, are easily produced or collected on the laminating surface. Further, the shutters 5 may carry particles into the processing chamber.

Further, the shutters 5 and the device that drives the shutters 5 are located outside the processing chamber. Thus, as the substrate laminating device becomes more complex and larger, the manufacturing cost as well as the maintenance cost of the substrate laminating device increases.

One aspect of the present invention is a laminated substrate manufacturing apparatus for laminating first surfaces of two substrates to each other in a processing chamber. Each substrate includes a second surface located on the opposite the first surface. The laminated substrate manufacturing apparatus includes a first holding plate and a second holding plate which hold the substrates. A substrate conveying device conveys the two substrates into and out of the processing chamber. The substrate conveying device attracts only the second surfaces of the two substrates and transfers the two substrates to and from the first and the second holding plates.

A further aspect of the present invention is a substrate manufacturing apparatus for laminating first surfaces of two-substrates to each other in a processing chamber. Each substrate includes a second surface located on the opposite side of the first surface. The substrate manufacturing apparatus is provided with a robot hand, including a distal portion that droops due to its own weight, for conveying the two substrates into the processing chamber while holding the second surfaces of the two substrates. A deformation prevention device corrects the drooping of the distal portion of the robot hand.

Another aspect of the present invention is a substrate manufacturing apparatus for laminating first surfaces of two substrates to each other in a processing chamber. Each substrate includes a second surface located opposite the first surface. The substrate manufacturing apparatus includes a first holding plate and a second holding plate. A robot hand, including a distal portion that droops due to its own weight, conveys the two substrates into the processing chamber while holding the second surfaces of the two substrates. A substrate conveying device attracts only the second surfaces of the two substrates and transfers the two substrates to and from the first and the second holding plates. A deformation prevention device corrects the drooping of the distal end of the robot hand.

A further aspect of the present invention is a method for manufacturing a laminated substrate. The method includes conveying an upper substrate and a lower substrate into a processing chamber with a robot hand. The upper substrate includes a portion at which deformation is relatively small and a portion at which deformation is relatively large when held by the robot hand. The method further includes transferring the upper substrate from the robot hand to an upper holding device including a plurality of attraction pads, transferring the upper substrate from the upper holding device to a holding plate, and laminating the upper substrate and the lower substrate to one another in the processing chamber. The transferring of the upper substrate from the robot hand includes controlling vacuum pressure communicated to the attraction pads and sequentially attracting the upper substrate from the portion at which deformation is relatively small to the portion at which deformation is relatively large.

Another aspect of the present invention is a method for manufacturing a laminated substrate. The method includes conveying an upper substrate and a lower substrate into a processing chamber with a robot hand, and transferring the upper substrate from the robot hand to an upper holding device. The upper substrate includes a portion at which deformation is relatively small and a portion at which deformation is relatively large when held by the robot hand. The method further includes transferring the upper substrate from the upper holding device to a holding plate including a plurality of attraction holes, and laminating the upper substrate and the lower substrate to one another in the processing chamber. The transferring of the upper surface from the upper holding device includes controlling vacuum pressure communicated to the attraction pads and sequentially attracting the upper substrate from the portion at which deformation is relatively small to the portion at which deformation is relatively large.

BRIEF DESCRIPTION OF THE DRAWINGS

The invention, together with objects and advantages thereof, may best be understood by reference to the following description of the presently preferred embodiments together with the accompanying drawings in which:

FIGS. 11A, 11B, and 11C are cross sectional views of an attraction pad;

DETAILED DESCRIPTION OF THE PREFERRED EMBODIMENTS

Figure 1:
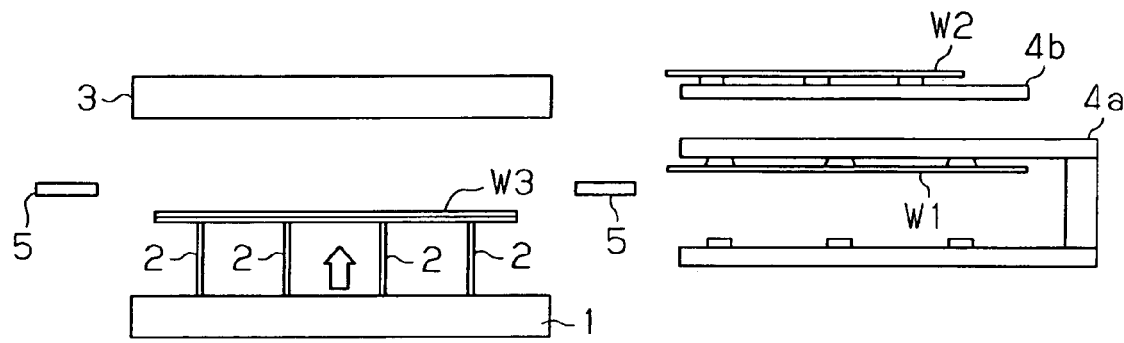
FIGS. 1 to 3 are schematic diagrams showing the operation of a conventional laminated substrate manufacturing apparatus.
Figure 2:
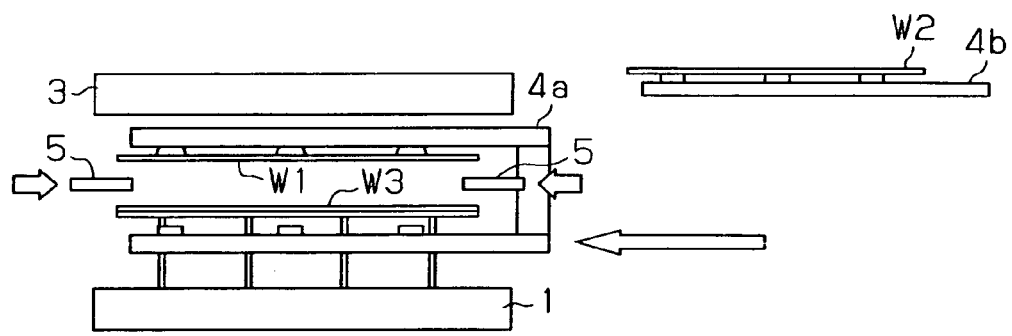
Figure 3:
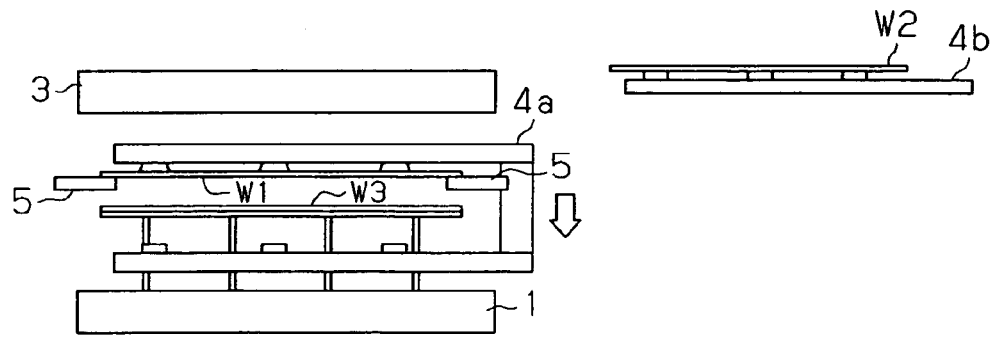
Figure 4:
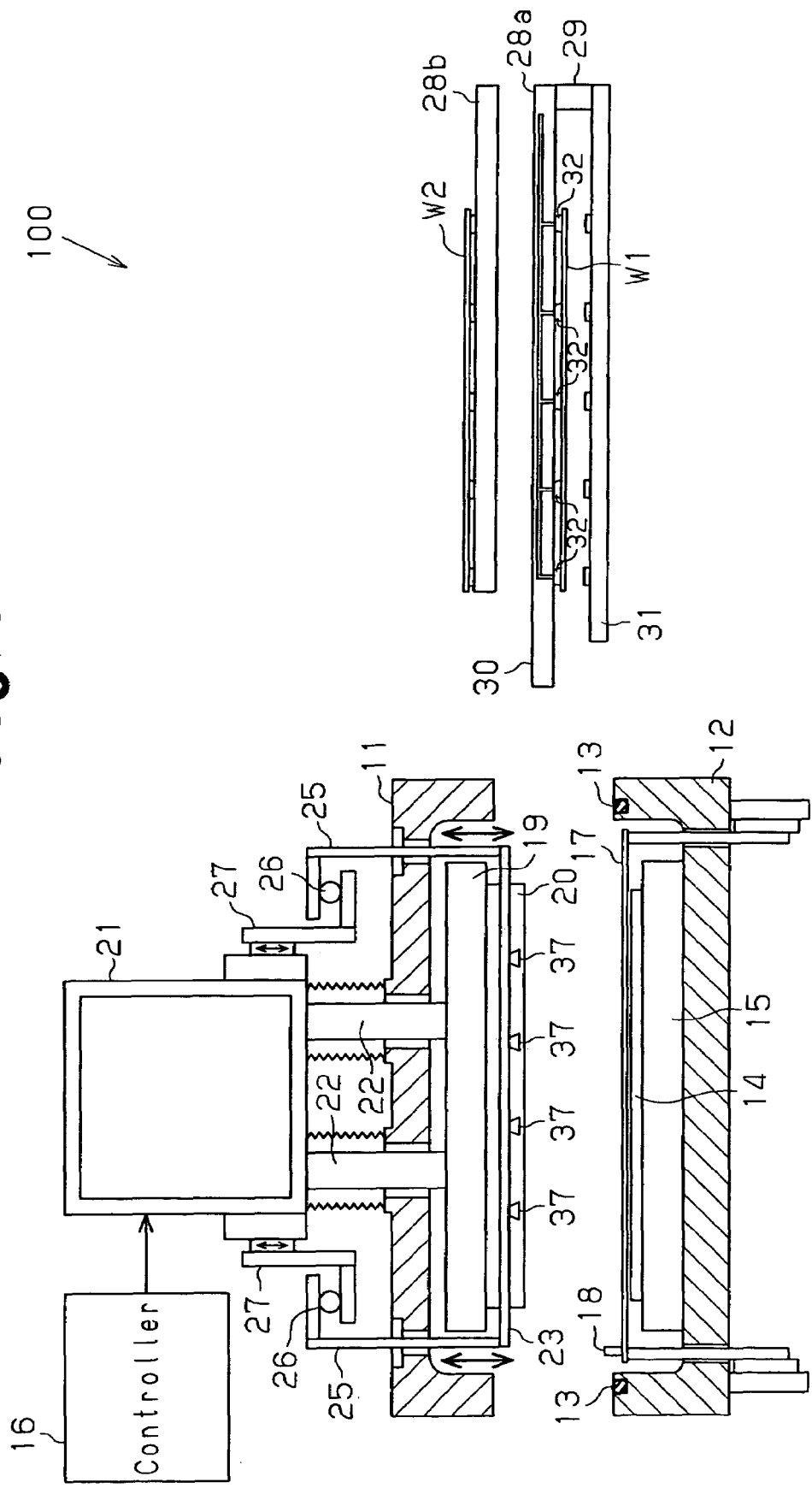
FIG. 4 is a schematic diagram showing a laminated substrate manufacturing apparatus according to a first embodiment of the present invention.

FIG. 4 shows a laminated substrate manufacturing apparatus (pressing apparatus) 100 according to a first preferred embodiment of the present invention. The laminated substrate manufacturing apparatus 100 includes an upper shell 11 and a lower shell 12. The upper shell 11 is lowered and raised with respect to the lower shell 12 by a driving mechanism such as an actuator (not shown).

When the upper shell 11 is raised until it contacts the edge of the lower shell 12, the upper shell 11 and the lower shell 12 become sealed and define a processing chamber (vacuum chamber).

A seal 13 is attached on an upper surface of the edge of the lower shell 12 that contacts a lower surface of the edge of the upper shell 11. The seal 13 ensures hermetic seal of the vacuum chamber.

A table 15 (second holding plate) including a lower mass (surface plate) 14 is arranged in the lower shell 12. The table 15 is provided with an electrostatic chuck function. A controller 16 controls the electrostatic chuck operation for a substrate W2.

A lower holding device 17 is supported in the lower shell 12 so that it may be raised and lowered by a driving device (not shown). The lower holding device 17 has the form of a fence (ladder-shaped) and includes a plurality of support rods, each having ends connected to a connecting frame. Accommodating grooves are formed in the table 15 for accommodating each support rod so that the support rod is not exposed from the upper surface of the table 15 when the lower holding device 17 is lowered to the lowermost position.

A deformation prevention piece 18, projecting upward, is formed on one side of the frame configuring the lower holding device 17. The deformation prevention piece 18 supports a distal end of a first robot hand 28a, and prevents the first robot hand 28a from drooping, or deforming downward, due to its own weight.

An upper mass (surface plate) 19 is supported above the table 15. A pressing plate 20 (first holding plate) is attached to a lower surface of the upper mass 19. The upper mass 19 is supported by suspension shafts 22. The suspension shafts 22 are coupled to a driving device 21, which includes a motor, above the upper shell 11. The upper mass 19, which is controlled by the driving device 21, is lowered and raised under the upper shell 11. The pressing plate 20 is lowered and raised integrally with the upper mass 19.

Figure 12:
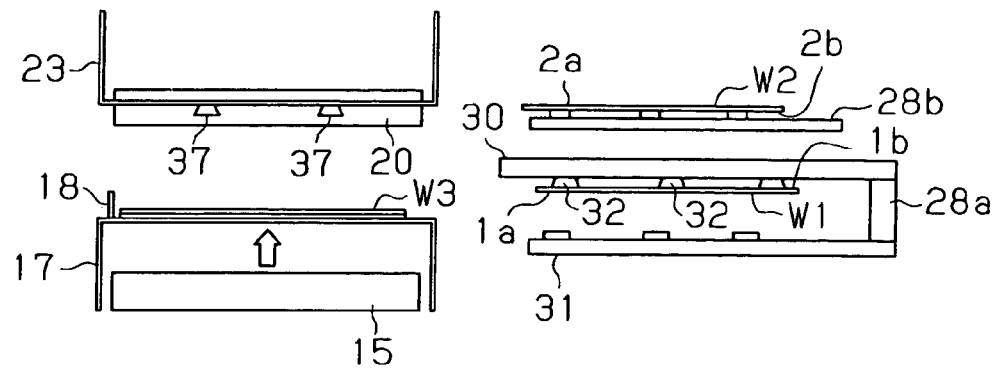
FIGS. 12 to 23 are schematic views showing the operation of the apparatus of FIG. 1.

Referring to FIG. 12, the pressing plate 20 attracts the upper surface 1b (non-laminating surface) of the substrate W1 and is provided with two functions for attracting the substrate W1, a vacuum chuck function and an electrostatic chuck function. The functions are controlled and selected by the controller 16.

An upper holding device 23 is arranged below the pressing plate 20. In the same manner as the lower holding device 17, the upper holding device 23 has the form of a fence and includes a plurality of support rods, each having ends connected to a connecting frame. A plurality of attraction pads 37 opening in the downward direction are arranged on each support rod to attract the upper surface 1b of the substrate W1.

Support shafts 25, extending upward through the upper shell 11, are attached to opposite sides of the upper holding device 23. The upper ends of the support shaft 25 are supported by lifting shafts 27 through flexible couplings 26. The driving device 21 controls the raising and lowering of the lifting shaft 27.

The driving device 21 controls the lowering and raising of the upper holding device 23. The flexible couplings 26 support the upper holding device 23 movably in the horizontal direction with respect to the lifting shafts 27. The flexible couplings 26 tolerate relative movement in the horizontal direction between the pressing plate 20 and the upper holding device 23 when performing an alignment process to correct displacement in the horizontal direction of the substrate W1 that is held by the pressing plate 20.

The first robot hand 28a and the second robot hand 28b convey the substrate W1 and the substrate W2, respectively, to a position between the lower holding device 17 and the upper holding device 23. The first robot hand 28a includes a main frame 29 located on the basal side. Further, the first robot hand 28a includes upper arms 30 and lower arms 31. The upper and lower arms 30 and 31 extend parallel to each other and are coupled to the main frame 29. Attraction pads 32 for attracting the substrate W1 are formed on the upper arms 30. The lower arms 31 support a laminated substrate (panel) W3.

Figure 13:
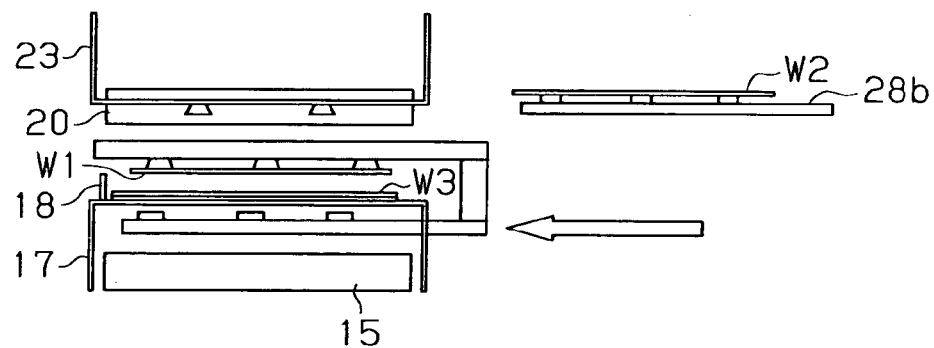

The upper arms 30 are longer than the lower arm 31. When advancing into the processing chamber, the distal end of the upper arm 30 enters the movement path of the deformation prevention piece 18 of the lower holding device 17 (refer to FIG. 12 to FIG. 14).

Figure 6:
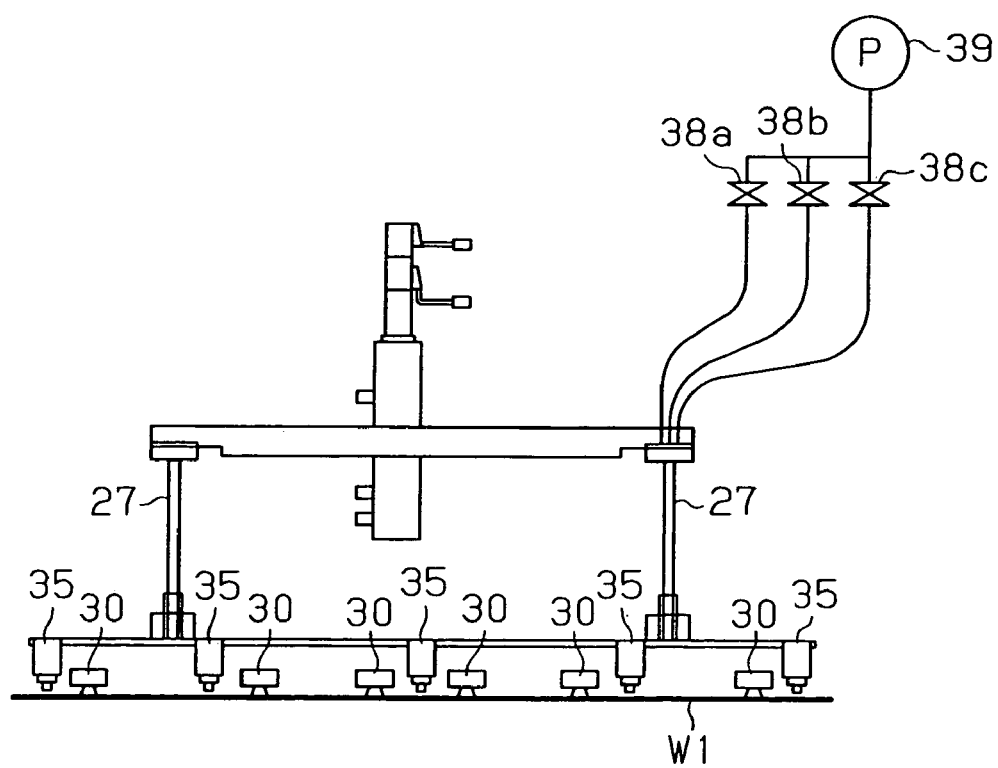
FIG. 6 is a side view showing the upper holding device and a first robot hand.
Figure 7:
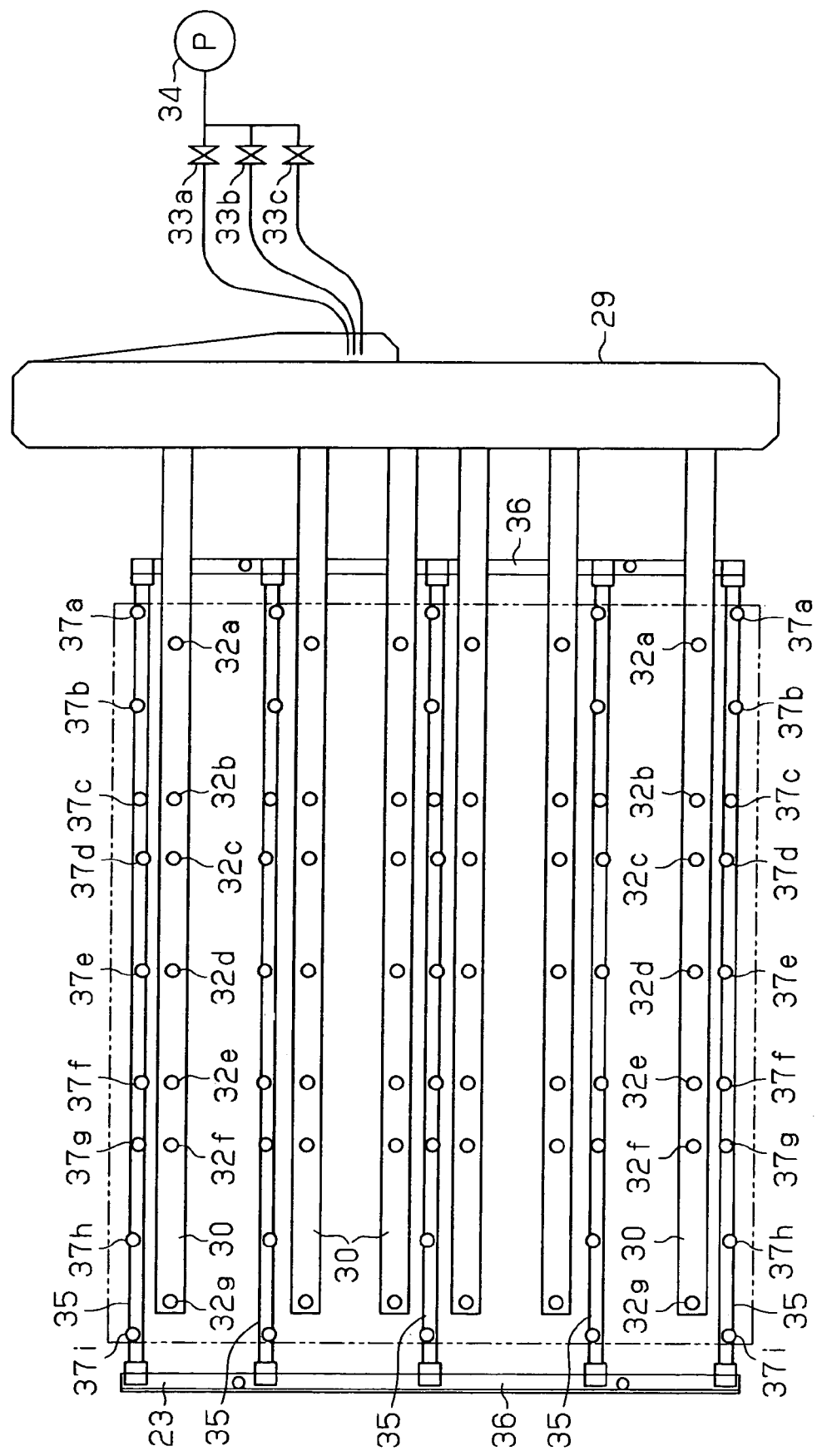
FIG. 7 is a bottom view showing the upper holding device and the first robot hand.

FIGS. 6 and 7 show the positional relationship between the upper arms 30 of the first robot hand 28a and the upper holding device 23 when the substrate W1 is conveyed into the processing chamber. Six upper arms 30 extended parallel to each other from the main frame 29. Seven attraction pads 32a to 32g are arranged on each upper arm 30.

Three tube lines, supplying vacuum pressure, extending from the main frame 29, are arranged in each upper arm 30. Each tube line is connected to a vacuum pressure source 34 through three valves 33a to 33c arranged outside the main frame 29. The valves 33a to 33c are controlled by the controller 16. An attraction control device includes the controller 16 and the valves 33a to 33c.

The suction force of the three attraction pads 32c, 32d, and 32e positioned in the middle of each upper arm 30 is adjusted by operating the valve 33c. The suction force of the two attraction pads 32b and 32f positioned at the outer sides of the attraction pads 32c, 32d, and 32e is adjusted by operating the valve 33b. The suction force of the two attraction pads 32a and 32g positioned near the two ends of each upper arm 30 is adjusted by operating the valve 33a. This configuration is common to all six upper arms 30.

Prior to conveying the substrate W1 into the processing chamber, the substrate W1 is attracted to the upper arms 30. More specifically, the valve 33c is first opened, and the attraction pads 32c, 32d and 32e of each upper arm 30 attract the longitudinally central portion of the substrate W1. Next, the valve 33b is opened, and the attraction pads 32b, 32f of each upper arm 30 attract the substrate W1. Finally, the valve 33a is opened, and the attraction pads 32a, 32g attract the substrate W1.

Such control prevents the substrate W1 from deforming when the upper arms 30 attract the substrate W1. The order of opening and closing of the valves 33a to 33c may be appropriately changed in accordance with the state of deformation of the substrate W1 that is attracted to the upper arms 30.

As shown in FIG. 7, the upper holding device 23 includes five support rods 35, the ends of which are coupled to two coupling frames 36. Nine attraction pads 37a to 37i are arranged on each support rod 35. Each support rod 35 includes three tube lines, extending from the coupling frame 36, for supplying vacuum pressure. Each tube line is connected to a vacuum pressure source 39 through three valves 38a to 38c arranged outside the coupling frame 36. The valves 38a to 38c are controlled by the controller 16. An attraction control device includes the controller 16 and the valves 38a to 38c.

The suction force of the three attraction pads 37d, 37e, and 37f positioned near the middle of each support rod 35 is adjusted by operating the valve 38c. In each support rod 35, the suction force of the two attraction pads 37c, 37g positioned at the outer sides of the attraction pads 37d, 37e, and 37f is adjusted by operating the valve 38b. Further, in each support rod 35, the suction force of the attraction pads 37a, 37b, 37h, and 37i arranged in pairs at the outer sides of the attraction pads 37c and 37g or near the ends of each supporting rod 35 is adjusted by operating the valve 38a. This configuration is common to all five support rods 35.

When the upper holding device 23 attracts the substrate W1, the valve 38c is first opened, and the attraction pads 37d, 37e, and 37f of each supporting rod 35 attract the longitudinal central portion of the substrate W1. Next, the valve 38b is opened, and the attraction pads 37c, 37g of each support rod 35 attract the substrate W1. Finally, the valve 38a is opened, and the attraction pads 37a, 37b, 37h, 37i attract the substrate W1.

Such control prevents the substrate W1 from deforming when the support rod 35 attracts the substrate W1. The order of opening and closing of each valve 38a to 38c may be appropriately changed in accordance with the state of deformation of the substrate W1 that is attracted to the first robot hand 28a.

Figure 9:
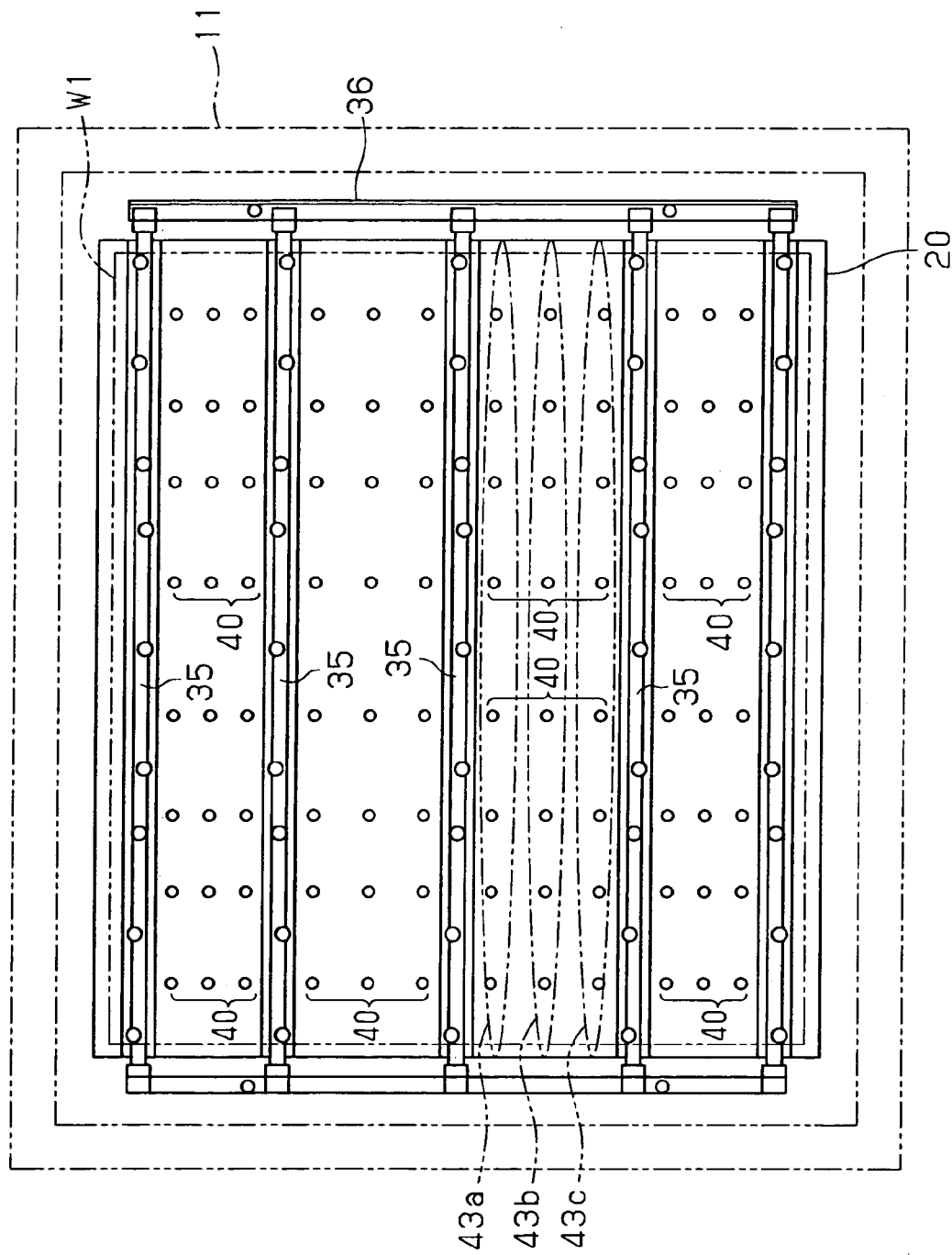
FIG. 9 is a bottom view showing the upper holding device and the pressing plate.

FIG. 9 shows the positional relationship between the support rods 35 of the upper holding device 23 and a plurality of attraction holes 40 formed on the pressing plate 20. Three rows 43a, 43b, and 43c, each including eight attraction holes 40, are arranged between and parallel to two adjacent support rods 35.

Figure 8:
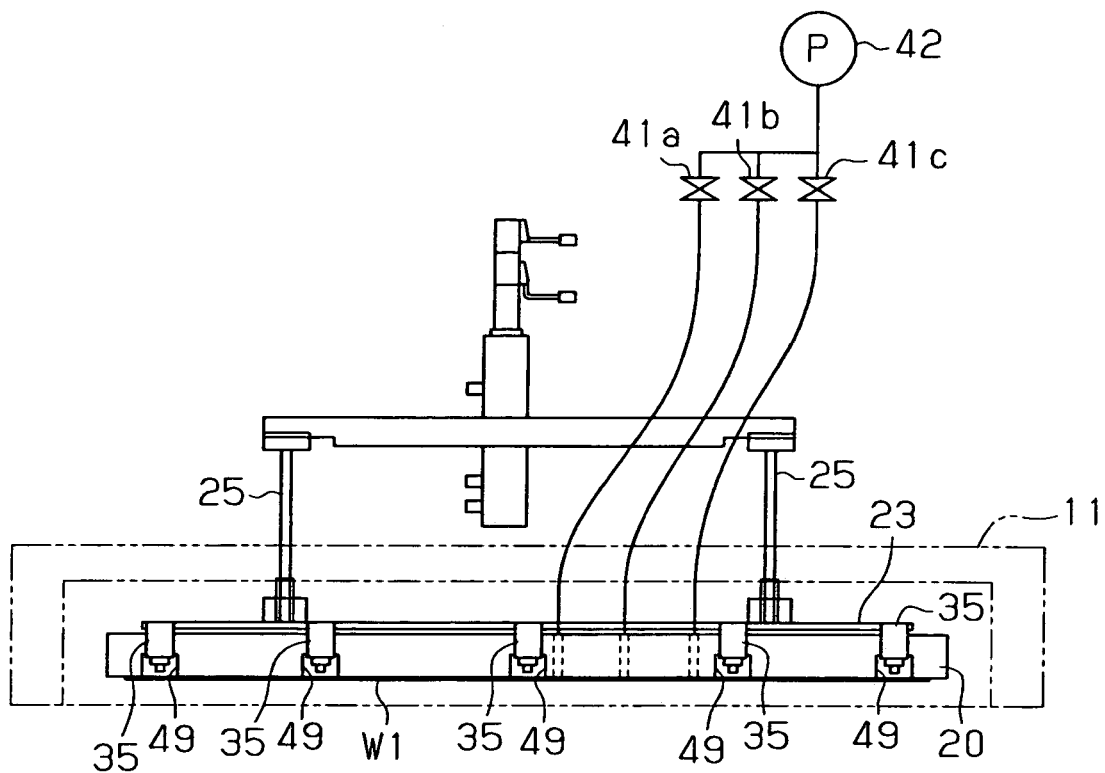
FIG. 8 is a side view showing the upper holding device and the pressing plate.

As shown in FIG. 8, the three rows 43a, 43b, 43c are each connected to one of three tube lines. The three tube lines are connected to a vacuum pressure source 42 through three valves 41a to 41c. The valves 41a to 41c are controlled by the controller 16.

Of the three rows of attraction holes 40, the attraction force of the attraction holes 40 in row 43a is adjusted by operating the valve 41a. The attraction force of the attraction holes 40 in the middle row 43b is adjusted by operating the valve 41b. The attraction force of the attraction hole 40 in row 43c is adjusted by operating the valve 41c. The valves 41a and 41c for rows 43a and 43c, which are arranged closer to the support rods 35, are first opened. Then, the valve 41b for row 43b arranged distant from the support rod 35 is opened. The same control is also performed for the attraction holes 40 between the other support rods 35.

Figure 10:
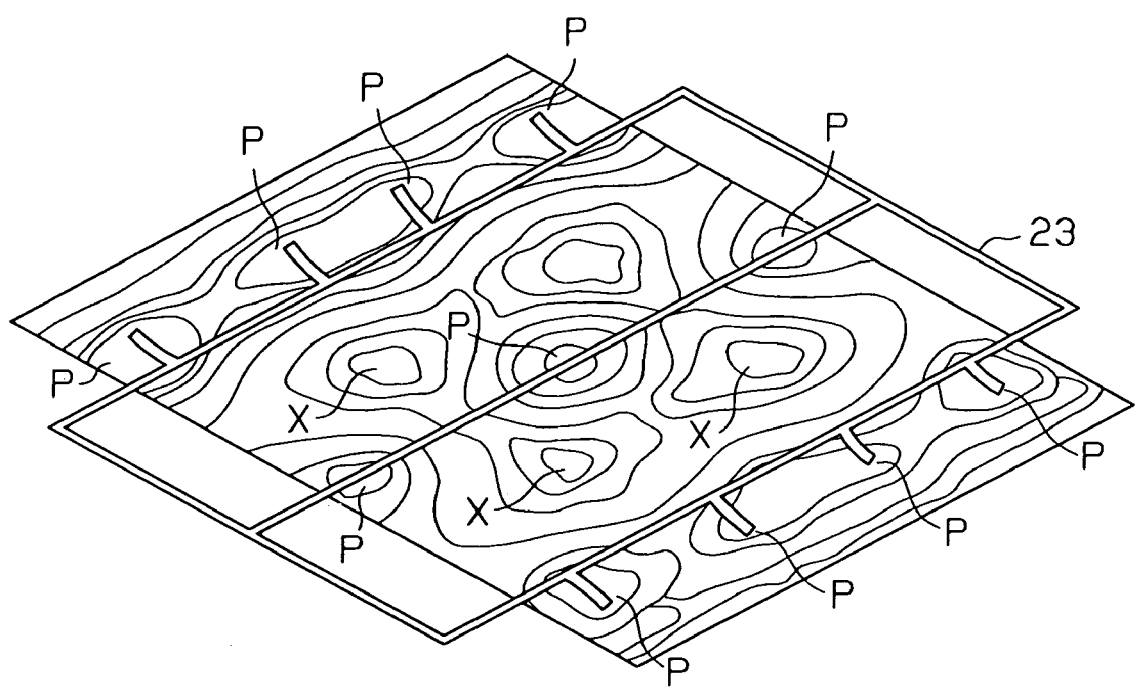
FIG. 10 is a diagram showing an analytical result of the deformation of the substrate attracted to the upper holding device.

FIG. 10 shows one example of an analytical result of the deformation of the substrate W1 attracted by the upper holding device 23. The result shows that deformation X becomes greater as the distance from portions P, where the substrate W1 is attracted to the attraction pads, increases.

By opening the valves 41a to 41c in the order mentioned above, portions where the deformation is relatively small are attracted to the attraction hole 40 to correct the deformation. The remaining portions are attracted to attraction pads. Thus, the substrate W1 is attracted without being deformed.

FIGS. 11A, 11B, and 11C specifically show the structure of the attraction pad 37a of the upper holding device 23. The other attraction pads 37b to 37i and attraction pads 32 of the first robot hand 28a also have the same structure.

In the support rod 35, a contact member 44 is supported movably in the vertical direction, and an output tube 45 from where the vacuum pressure is supplied is inserted through the contact member 44. A flange 46 that comes into contact with the contact member 44 is formed on the output tube 45 in the support rod 35. The attraction pad 37a is attached to the distal end of the output tube 45 outside the support rod 35. The attraction pad 37a has an accordion configuration and is thus compressible and extendible.

A coil spring 47 is arranged between the attraction pad 37a and the support rod 35. The coil spring 47 biases the attraction pad 37 away from the support rod 35 in the downward direction.

A plurality of coil springs 48 are arranged around the output tube 45 in the support rod 35 between the contact member 44 and the bottom of the support rod 35. The coil springs 48 bias the contact member 44 in the upward direction when the gap between the contact member 44 and the bottom of the support rod 35 becomes equal to or less than a predetermined value.

When receiving the substrate W1 from the first robot hand 28a, a pressing force acts in the upward direction on the attraction pad 37a. In this state, as shown in FIG. 11B, the coil spring 47 is compressed and the attraction pad 37a is raised. When transferring the substrate W1 to the pressing plate 20, a tensile force acts in the downward direction on the attraction pad 37a. Thus, as shown in FIG. 11C, the coil spring 47 is extended and the coil springs 48 are compressed to lower the attraction pad 37a.

Such operation ensures the transfer of the substrate W1 and the attraction of the substrate W1. Further, due to the accordion configuration of the attraction pad 37a, the substrate W1 is stably attracted even if the substrate W1 is deformed or curved.

Figure 5:
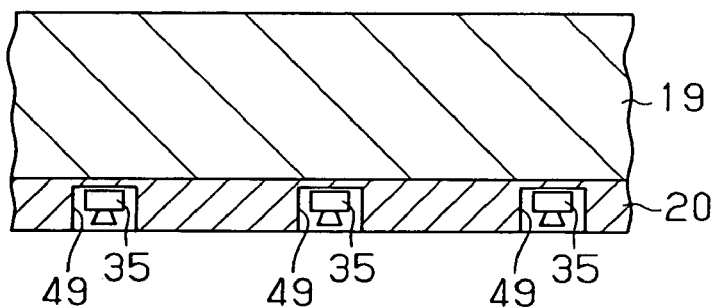
FIG. 5 is a cross sectional view of a pressing plate and an upper holding device of the first embodiment.

As shown in FIG. 5, an accommodating groove 49 is formed in the lower surface of the pressing plate 20 for each support rod 35 of the upper holding device 23 to accommodate the support rod 35. When the upper holding device 23 is raised to the uppermost position, each support rod 35 is accommodated in the corresponding accommodating groove 49 so that the support rod 35 is not exposed or projected downward from the lower surface of the pressing plate 20.

The operation of the laminated substrate manufacturing apparatus 100 will now be described with reference to FIGS. 12 to 23.

Prior to the transfer of the substrates W1 and W2, the substrate W1 is attracted to the first robot hand 28a, and the lower surface 2b (non-laminating surface) of the substrate W2 is supported by the second robot hand 28b, as shown in FIG. 12. Further, a laminated substrate W3, which has been laminated in the previous cycle, is supported by the lower holding device 17.

Figure 14:
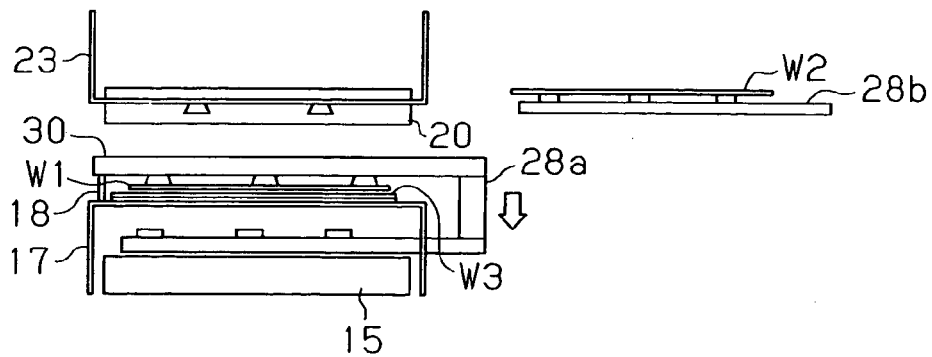

From this state, the first robot hand 28a advances into the processing chamber (FIG. 13) and is then lowered (FIG. 14). In this state, the distal end of the upper arms 30 of the first robot hand 28a is supported by the deformation prevention piece 18 to correct the drooping of the upper arm 30 due to its weight.

Figure 15:
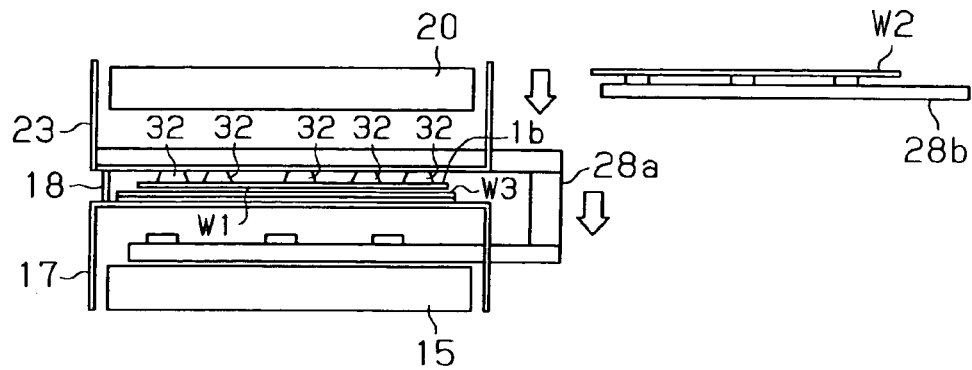
Figure 16:
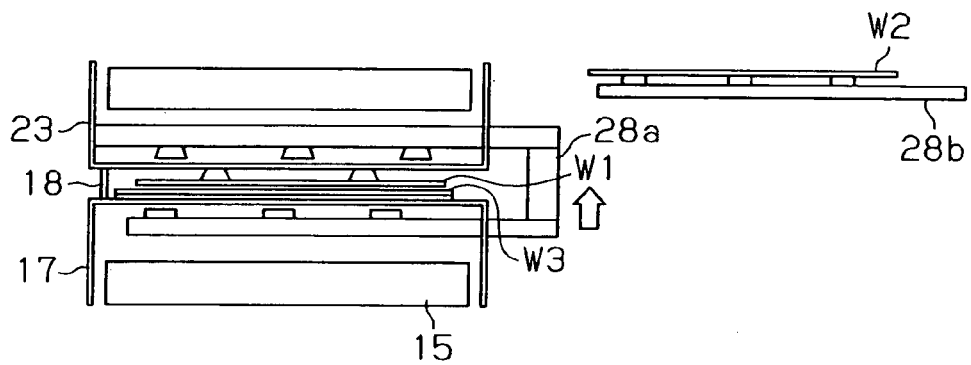
Figure 17:
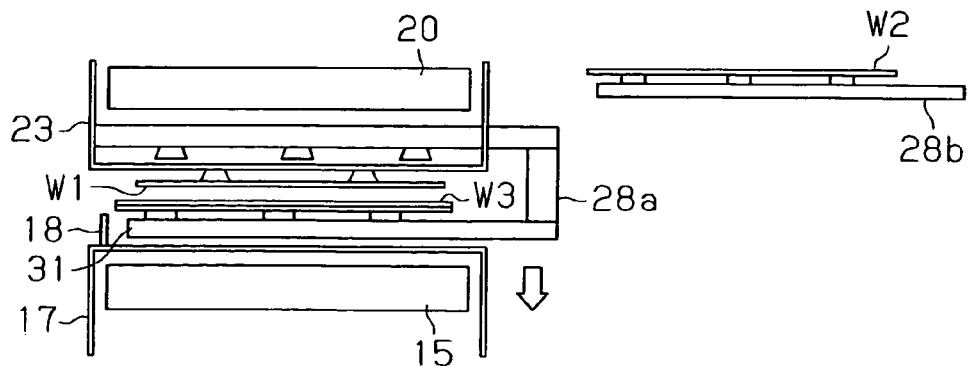

Then, the upper holding device 23 is lowered, and the substrate W1 is attracted to the upper holding device 23 (FIG. 15). The first robot hand 28a releases the substrate W1 and moves upward (FIG. 16). Then, the lower holding device 17 is lowered (FIG. 17). In this state, the laminated substrate W3 is supported by the lower arms 31 of the first robot hand 28a.

Figure 18:
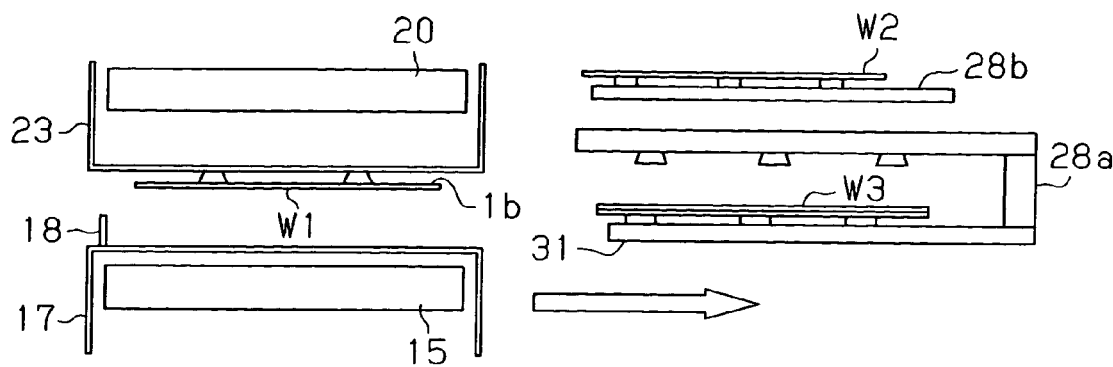
Figure 19:
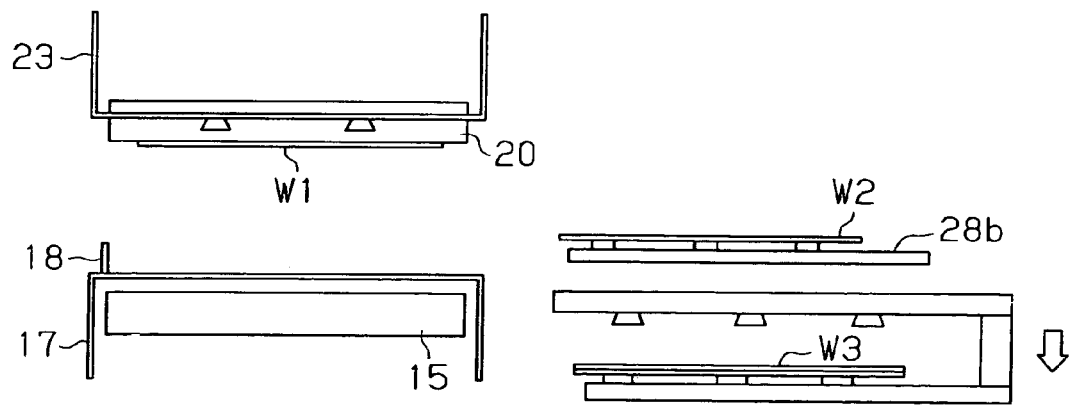

The first robot hand 28a then exits from the processing chamber (FIG. 18). Then, the upper holding device 23 is lifted. In a state contacting the lower surface of the pressing plate 20, the substrate W1 is attracted to the pressing plate 20 (FIG. 19).

Figure 20:
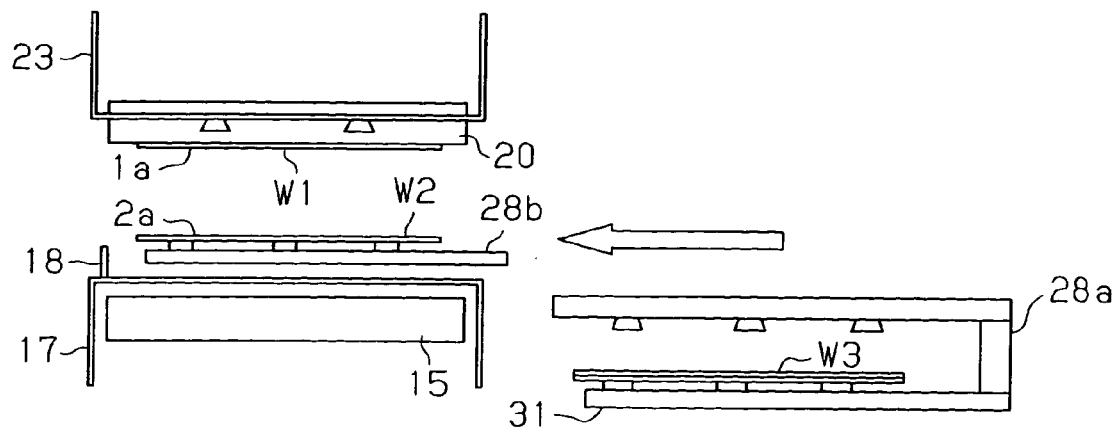
Figure 21:
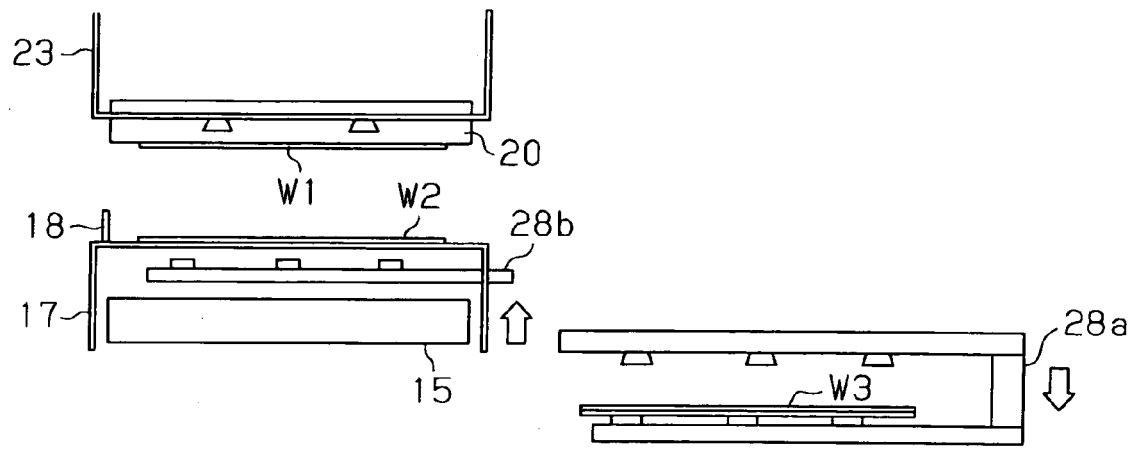

The second robot hand 28b then advances into the processing chamber (FIG. 20). The lower holding device 17 is then raised, and the substrate W2 is supported on the lower holding device 17 (FIG. 21).

Figure 22:
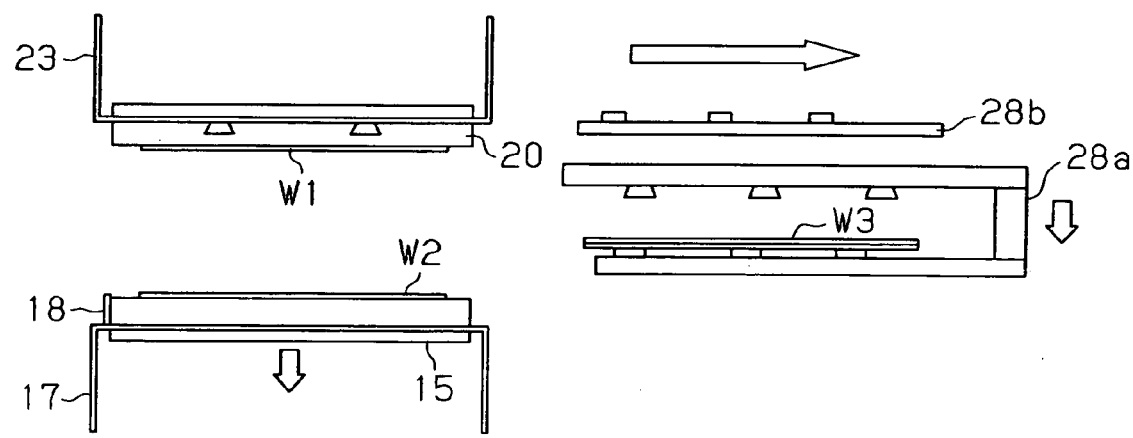
Figure 23:
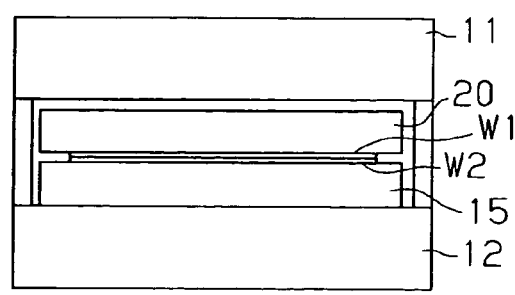

The second robot hand 28b then exits the processing chamber, the lower holding device 17 is lowered, and substrate W2 is supported on the table 15 in a state in which the lower surface 2b of the table 15 is attracted to the table 15 (FIG. 22). The upper shell 11 and the lower shell 12 are then closed to seal the processing chamber, and the pressing process is performed in a vacuum environment (FIG. 23). During the pressing process, the two substrates W1 and W2 are aligned with each other by correcting their relative position with respect to each other in the horizontal direction within a certain range. The displacement in the horizontal direction of the pressing plate 20 and the upper holding device 23 is absorbed by the flexible couplings 26 during the alignment.

The laminated substrate manufacturing apparatus 100 of the first embodiment has the advantages described below.

(1) When attracting the substrate W1 to the pressing plate 20, the upper holding device 23, which moves within the processing chamber, receives the substrate W1 from the first robot hand 28a, and then the pressing plate 20 receives the substrate W1 from the upper holding device 23. Thus, the shutter used in the prior art is unnecessary. This enables the laminated substrate manufacturing apparatus to be miniaturized and simplified.

(2) The upper holding device 23 attracts the upper surface of the substrate W1 and thus does not contact the lower surface 1a (laminating surface). Further, the lower holding device 17 attracts the lower surface 2b of the substrate W2 and thus does not contact the upper surface 1b (laminating surface). Therefore, particles are not collected on the laminating surfaces.

(3) Since the shutter that enters the processing chamber from the exterior is unnecessary, particles are prevented from entering the processing chamber.

(4) The accommodating grooves 49 for accommodating the support rods 35 of the upper holding device 23 are formed in the lower surface of the pressing plate 20. Thus, the support rods 35 do not interfere with the attraction of the substrate W1 to the pressing plate 20.

(5) The flexible couplings 26 enable movement of the upper holding device 23 in the horizontal direction. This corrects displacements of the substrate W1 in the horizontal direction.

(6) The deformation prevention piece 18 is arranged on the lower holding device 17. Thus, when transferring the substrate W1 from the first robot hand 28a to the upper holding device 23, the upper arms 30 of the first robot hand 28a are preventing from drooping due to its weight. This further prevents deformation of the substrate W1.

(7) When the substrate W1 is attracted to the first robot hand 28a, the attraction pads at the middle portion of the upper arms 30 attract the substrate W1. Then, the attraction pads between those at the central portion and the ends of the upper arm 30 attract the substrate W1. Finally, the attraction pads on both ends attract the substrate W1. Therefore, the substrate W1 is attracted to the upper arm 30 while correcting, or eliminating, the deformation of the substrate W1. Further, displacement of the substrate W1 during the attraction operation is prevented, and the substrate W1 is held in an ensured manner.

(8) When attracting the substrate W1 to the upper 30 holding device 23, attraction is performed in sequence from portions of the substrate W1 where the deformation is small. For example, the attraction pads at the central portion of each support rod 35 first attract the substrate W1. The attraction pads between pads located at the central portion and the ends of the support rod 35 then attract the substrate W1. Finally, the attraction pads at both ends of each support rod 35 attract the substrate W1. Therefore, the substrate W1 is attracted to the support rods 35 while correcting the deformation of the substrate W1. Further, displacement of the substrate W1 during the attraction operation is prevented, and the substrate W1 is held in an ensured manner.

(9) When attracting the substrate W1 to the pressing plate 20, attraction is performed in sequence from portions of the substrate W1 where the deformation is small. For example, portions of the substrate W1 that are close to portions attracted to the support rods 35 of the upper holding device 23 are attracted to the pressing plate 20. Then, farther portions are attracted to the pressing plate. Therefore, the substrate W1 is attracted to the pressing plate 20 while correcting the deformation of the substrate W1. Further, displacement of the substrate W1 during the attraction operation is prevented, and the substrate W1 is held in an ensured manner.

(10) The attraction pads arranged on the upper arm 30 of the first robot hand 28a and the support rod 35 of the upper holding device 23 are compressible and extendible with respect to the upper arm 30 or the support rod 35. This ensures attraction of the substrate W1 even if the substrate is deformed or curved.

(11) The deformation prevention piece 18 is arranged on the lower holding device 17. Thus, the drooping of the upper arms 30 due to its own weight is prevented with the same driving source as that of the lower holding device 17.

Figure 24:
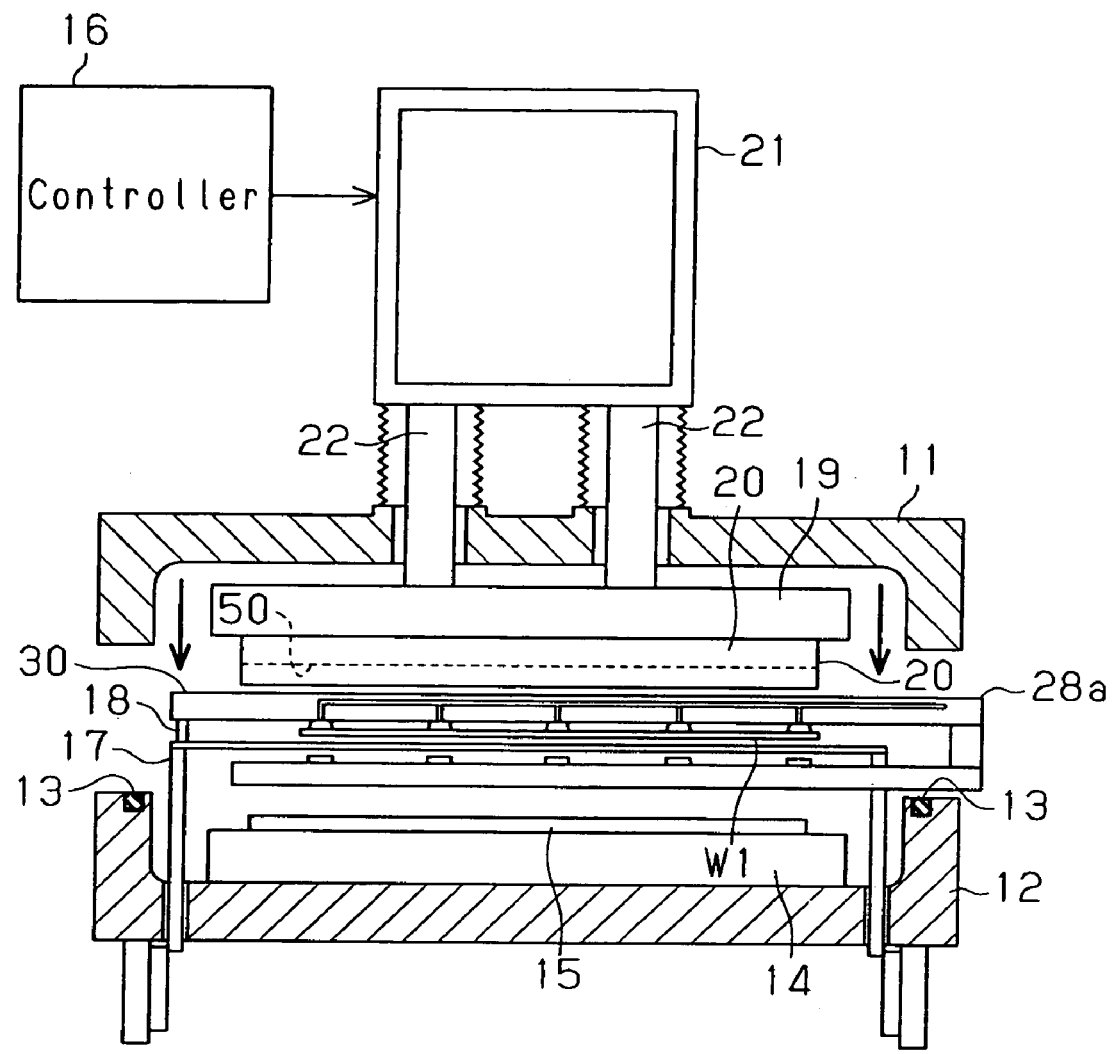
FIG. 24 is a schematic view showing a laminated substrate manufacturing apparatus according to a second embodiment of the present invention.

A laminated substrate manufacturing apparatus according to a second embodiment will now be described with reference to FIG. 24. In the second embodiment, the upper holding device 23 of the first embodiment is omitted. A substrate is directly transferred between the first robot hand 28a and the pressing plate 20. Accommodating grooves 50 for accommodating the upper arms 30 of the first robot hand 28a are arranged in the pressing plate 20. The other parts are the same as in the first embodiment.

In the laminated substrate manufacturing apparatus of the second embodiment, after the first robot hand 28a attracting the substrate W1 advances into the processing chamber, the lower holding device 17 is raised to support the upper arms 30 on the deformation prevention piece 18. The pressing plate 20 is then lowered to attract the substrate W1. Then, the first robot hand 28a moves out of the processing chamber. The other operations are the same as the first embodiment.

In the second embodiment, the upper holding device 23 is not used. Thus, the laminated substrate manufacturing apparatus is more compact and simple.

In each embodiment, the deformation prevention piece 18 may be separate from the lower holding device 17.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A laminated substrate manufacturing apparatus for laminating first surfaces of upper and lower substrates to each other in a processing chamber, wherein each substrate includes a second surface located on an opposite side of the first surface, the laminated substrate manufacturing apparatus comprising:

a first holding plate and a second holding plate for respectively holding the upper and lower substrates and pressing the upper and lower substrates against one another; and a substrate conveying device for conveying the substrates into and out of the processing chamber, the substrate conveying device including a ladder-shaped upper holding device for attracting and contacting only the second surface of the upper substrate and transferring the upper substrate directly to and from the first holding plate, wherein said first holding plate is arranged above said second holding plate and includes a plurality of accommodating grooves configured to accommodate the upper holding device.

2. The laminated substrate manufacturing apparatus according to claim 1, wherein the substrates are an upper substrate and a lower substrate, the substrate conveying device including:

a robot hand for holding the second surfaces of the upper and lower substrates and conveying the upper substrate and the lower substrate into the processing chamber; and a plurality of support rods, supported so that lowering and raising of the support rods is enabled in the processing chamber, for attracting the upper substrate held by the robot hand;

wherein the first holding plate is a pressing plate that attracts the upper substrate, the second holding plate is a table that attracts the lower substrate, and the pressing plate includes the plurality of accommodating grooves, each accommodating one of the support rods.

3. The laminated substrate manufacturing apparatus according to claim 2, further comprising:

a lower holding device for transferring the lower substrate from the robot hand to the table; and a deformation prevention device, arranged on the lower holding device, for correcting deformation of a distal portion of the robot hand.

4. The laminated manufacturing apparatus according to claim 2, wherein the upper substrate includes a portion at which deformation is relatively small and a portion at which deformation is relatively large when held by the robot hand, and each support rod includes a plurality of attraction pads, the manufacturing apparatus further comprising:

an attraction controller for controlling vacuum pressure communicated to the attraction pads to sequentially attract the upper substrate from the portion at which deformation is relatively small to the portion at which deformation is relatively large when the support rods receive the upper substrate from the robot hand.

5. The laminated substrate manufacturing apparatus according to claim 4, wherein the attraction pads are elastically supported by the corresponding support rods.

6. The laminated substrate manufacturing apparatus according to claim 2, further comprising:

an upper holding device, including the support rods, for transferring the upper substrate from the robot hand to the pressing plate; and a driving device for moving the upper holding device upward and downward relative to the pressing plate, the upper holding device being supported movably in the horizontal direction by the driving device.

7. The laminated substrate manufacturing apparatus according to claim 6, wherein the upper substrate includes a portion at which deformation is relatively small and a portion at which deformation is relatively large when held by the upper holding device, and the pressing plate includes a plurality of attraction holes, the manufacturing apparatus further comprising:

an attraction controller for controlling vacuum pressure communicated to the plurality of attraction holes to sequentially attract the upper substrate from the portion at which deformation is relatively small to the portion at which deformation is relatively large when the pressing plate attracts the upper substrate held by the upper holding device.

8. The laminated substrate manufacturing apparatus according to claim 7, wherein the support rods extend parallel to one another, the attraction holes being arranged between adjacent support rods in a plurality of hole rows parallel to the support rods, the hole rows including a first hole row that is close to a support rod and a second hole row that is distant from said support rod; and wherein the attraction controller communicates the vacuum pressure to the attraction holes in the first hole row that is close to said support rod and then communicates vacuum pressure to the attraction holes in the second hole row that is distant from said support rod.

9. A substrate manufacturing apparatus for laminating first surfaces of two substrates to each other in a processing chamber, wherein each substrate includes a second surface located on an opposite side of the first surface, the substrate manufacturing apparatus comprising:

a first holding plate and a second holding plate for respectively holding the second surfaces of the upper and lower substrates and pressing the upper and lower substrates against one another;

a robot hand, including a distal portion that droops due to its own weight, for conveying the two substrates into the processing chamber while attracting and contacting only the second surfaces of the two substrates;

a ladder-shaped upper holding device for attracting and contacting only the second surface of the upper substrate and transferring the upper substrate directly to and from the first holding plate; and a deformation prevention device for correcting the drooping of the distal portion of the robot hand, wherein said first holding plate is arranged above said second holding plate, and wherein the first holding plate includes a plurality of accommodating grooves configured to accommodate the upper holding device.

10. A substrate manufacturing apparatus for laminating first surfaces of two substrates to each other in a processing chamber, wherein each substrate includes a second surface located on an opposite side of the first surface, the substrate manufacturing apparatus comprising:

a first holding plate and a second holding plate for respectively holding the second surfaces of the upper and lower substrates and pressing the upper and lower substrates against one another;

a robot hand, including a distal portion that droops due to its own weight, for conveying the two substrates into the processing chamber while holding the second surfaces of the two substrates; and a substrate conveying device for attracting and contacting only the second surfaces of the two substrates and transferring the two substrates directly to and from the first and the second holding plates, the substrate conveying device including a ladder-shaped upper holding device for attracting and contacting only the second surface of the upper substrate and transferring the upper substrate directly to and from the first holding plate; and a deformation prevention device for correcting the drooping of the distal portion of the robot hand, wherein said first holding plate is arranged above said second holding plate, and wherein the first holding plate includes a plurality of accommodating grooves configured to accommodate the upper holding device of the substrate conveying device.

11. The laminated substrate manufacturing apparatus according to claim 10, wherein the two substrates are an upper substrate and a lower substrate, the substrate conveying device including:
a plurality of support rods, supported so that lowering and raising of the support rods is enabled in the processing chamber, for attracting the upper substrate;
wherein the first holding plate is a pressing plate that attracts the upper substrate, the second holding plate is a table that attracts the lower substrate, and the pressing plate includes a plurality of accommodating grooves, each accommodating one of the support rods.

12. The laminated substrate manufacturing apparatus according to claim 11, further comprising:
a lower holding device for transferring the lower substrate from the robot hand to the table; and
a deformation prevention device, arranged on the lower holding device, for correcting deformation of the robot hand.

13. The laminated manufacturing apparatus according to claim 11, wherein the upper substrate includes a portion at which deformation is relatively small and a portion at which deformation is relatively large when held by the robot hand, and each support rod includes a plurality of attraction pads, the manufacturing apparatus further comprising:
an attraction controller for controlling vacuum pressure communicated to the attraction pads to sequentially attract the upper substrate from the portion at which deformation is relatively small to the portion at which deformation is relatively large when the support rods receive the upper substrate from the robot hand.

14. The laminated substrate manufacturing apparatus according to claim 13, wherein the attraction pads are elastically supported by the corresponding support rods.

15. The laminated substrate manufacturing apparatus according to claim 11, further comprising:
an upper holding device, including the support rods, for transferring the upper substrate from the robot hand to the pressing plate; and
a driving device for moving the upper holding device upward and downward relative to the pressing plate, the upper holding device being supported movably in the horizontal direction by the driving device.

16. The laminated substrate manufacturing apparatus according to claim 15, wherein the upper substrate includes a portion at which deformation is relatively small and a portion at which deformation is relatively large when held by the upper holding device, and the pressing plate includes a plurality of attraction holes, the manufacturing apparatus further comprising:
an attraction controller for controlling vacuum pressure communicated to the plurality of attraction holes to sequentially attract the upper substrate from the portion at which deformation is relatively small to the portion at which deformation is relatively large when the pressing plate attracts the upper substrate held by the upper holding device.

17. The laminated substrate manufacturing apparatus according to claim 16, wherein the support rods extend parallel to one another, the attraction holes being arranged between adjacent support rods in a plurality of hole rows parallel to the support rods, the hole rows including a first hole row that is close to a support rod and a second hole row that is distant from said support rod; and wherein the attraction controller communicates the vacuum pressure to the attraction holes in the first hole row that is close to said support rod and then communicates vacuum pressure to the attraction holes in the second hole row that is distant from said support rod.

18. A method for manufacturing a laminated substrate by laminating first surfaces of upper and lower substrates to each other in a processing chamber, wherein each substrate includes a second surface located opposite the first surface, the method comprising:
conveying the upper substrate and the lower substrate into the processing chamber with a robot hand without contacting the first surfaces of the substrates, the upper substrate including a portion at which deformation is relatively small and a portion at which deformation is relatively large when held by the robot hand;
transferring the upper substrate from the robot hand to a ladder-shaped upper holding device including a plurality of attraction pads for attracting and contacting only the second surface of the upper substrate;
transferring the upper substrate from the upper holding device directly to an upper holding plate, without contacting the first surface of the upper substrate while accommodating the upper holding device in a plurality of accommodating grooves formed in the upper holding plate; and
laminating the upper substrate and the lower substrate to one another in the processing chamber,
wherein said transferring the upper substrate from the robot hand includes controlling vacuum pressure communicated to the attraction pads and sequentially attracting the upper substrate from the portion at which deformation is relatively small to the portion at which deformation is relatively large.

19. A method for manufacturing a laminated substrate by laminating first surfaces of upper and lower substrates to each other in a processing chamber, wherein each substrate includes a second surface located opposite the first surface, the method comprising:
conveying the upper substrate and the lower substrate into the processing chamber with a robot hand, without contacting the first surfaces of the substrates;
transferring the upper substrate from the robot hand to a ladder-shaped upper holding device for attracting and contacting only the second surface of the upper substrate, the upper substrate including a portion at which deformation is relatively small and a portion at which deformation is relatively large when held by the robot hand;
transferring the upper substrate from the upper holding device directly to an upper holding plate including a plurality of attraction holes, without contacting the first surface of the upper substrate while accommodating the upper holding device in a plurality of accommodating grooves formed in the upper holding plate; and
laminating the upper substrate and the lower substrate to one another in the processing chamber,
wherein transferring the upper surface from the upper holding device includes controlling vacuum pressure communicated to the attraction pads and sequentially attracting the upper substrate from the portion at which deformation is relatively small to the portion at which deformation is relatively large.

20. The laminated manufacturing apparatus according to claim 1, wherein the ladder-shaped upper holding device has a plurality of support rods extending parallel to one another, and wherein the support rods are accommodated in the plurality of accommodating grooves of the first holding plate when transferring the upper substrate between the first holding plate and the ladder shaped upper holding device.

21. The substrate manufacturing apparatus according to claim 9, wherein the ladder-shaped upper holding device has a plurality of support rods extending parallel to one another, and wherein the support rods are accommodated in the plurality of accommodating grooves of the first holding plate when transferring the upper substrate between the first holding plate and the ladder shaped upper holding device.

22. The substrate manufacturing apparatus according to claim 10, wherein the ladder-shaped upper holding device has a plurality of support rods extending parallel to one another, and wherein the support rods are accommodated in the plurality of accommodating grooves of the first holding plate when transferring the upper substrate between the first holding plate and the ladder shaped upper holding device.

23. The apparatus according to claim 1, wherein the plurality of accommodating grooves extend only partially into said first holding plate.

24. The apparatus according to claim 9, wherein the plurality of accommodating grooves extend only partially into said first holding plate.

25. The apparatus according to claim 10, wherein the plurality of accommodating grooves extend only partially into said first holding plate.

26. The apparatus according to claim 18, wherein the plurality of accommodating grooves extend only partially into said first holding plate.

27. The apparatus according to claim 19, wherein the plurality of accommodating grooves extend only partially into said first holding plate.

* * * * *